July 10, 1951  V. KOBLER ET AL  2,559,772

MULTIHEAD DRY SHAVING APPARATUS

Filed Jan. 29, 1946

Inventors
Victor Kobler,
Werner Kobler
by Sommers & Young
Attorneys

Patented July 10, 1951

2,559,772

UNITED STATES PATENT OFFICE 2,559,772

MULTIHEAD DRY SHAVING APPARATUS

Victor Kobler and Werner Kobler,
Zurich, Switzerland

Application January 29, 1946, Serial No. 644,119
In Switzerland October 31, 1945

1 Claim. (Cl. 30—43)

The present invention relates to improvements in razors with blade moving means of the vibratory type, so-called dry shavers, and is concerned with the provision of a plurality of cutter-heads for the purpose of properly tensioning the skin in shaving so as to afford a clean and close-cut shaving operation. In this connection it is understood that the beard stubbles should not bend away, but rather should stand up at right angles, that is, normal to the skin surface, and that the skin pores should be opened transversely to as well as longitudinally of the direction of movement of the cutter head.

Two preferred forms of the invention are illustrated in the accompanying drawing, in which.

Figure 3:
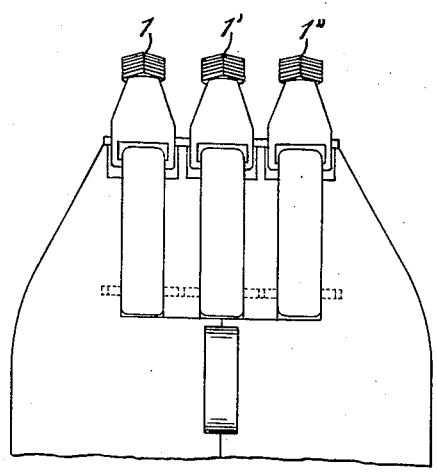

Fig. 3 a second form, in a side view.

Figure 1:
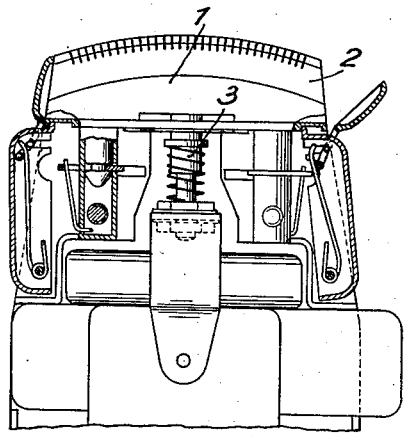
Fig. 1 shows a first example, partly in axial section.
Figure 2:
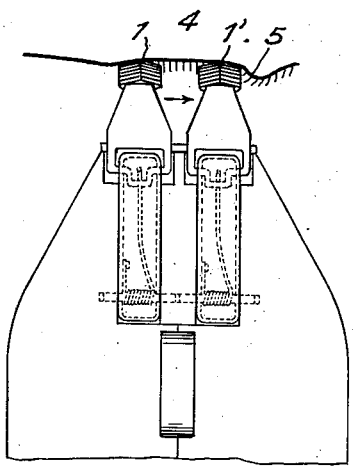
Fig. 2 is a side view thereof.

The head portion of the shaver shown in Figs. 1 and 2 comprises two cutter heads 1 and 1' spaced parallel to each other. Each of the said heads comprises a comb-shaped stationary hollow outer cutter 2, and an inner cutter not specifically illustrated, which latter is reciprocated by an actuating lever 3. The cutting faces of the outer and inner cutters are convexly curved on a circular arc in the longitudinal direction of the cutters for the purpose of tensioning the skin in this longitudinal direction when shaving. The inner and outer cutters are of obtuse inverted V-shape in cross-section, as shown in Fig. 2. Since two cutter heads are provided, the skin portion intermediate thereof is additionally tensioned transversely to the longitudinal direction of the cutters also. This is indicated at 4 in Fig. 2, while 5 designates the wave-like skin hump produced ahead of the cutter head 1' when moving the apparatus in the direction of the arrow. While, now, the hair tips in front of the cutter head 1' are swayed, due to the skin hump arising there, the hair tips on the skin portion between the two cutter heads stand upright, that is, normal to the skin surface, and are cut off by the following cutter head 1 close to the skin by virtue of the double tensioning of the skin both in the direction of movement and transverse thereto.

Fig. 3 shows an apparatus comprising three spaced and parallel cutter heads 1, 1' and 1", in which the effect attained by means of the form having two cutter heads, is doubled. The provision of more than three cutter heads may also be envisaged.

It is known, according to a previous proposal of the present inventors, to curve the inner and outer cutters in their longitudinal direction outwardly. By such means, the skin is tensioned by virtue of the curved cutting face, and the skin pores are expanded in the proper direction; the ends of the cutter head contact the skin with only a slight pressure and do not exert any painful contact thereonto, as in the case of straight faced cutters. In such prior forms, the tensioning of the skin in shaving is, however, not perfect, since in moving the cutting face over the skin, a wave-like trough is produced in front of the cutter, which interferes with the standing up of the hair tips.

What we claim and desire to secure by Letters Patent is:

In a dry shaving apparatus, a plurality of laterally spaced parallel cutter heads, the skin-contacting face of each cutter head being convexly curved in the longitudinal direction of its extent, for the purpose of attaining a maximum tensioning of the skin portion especially in a control area intermediate of the said heads both longitudinally and transversely of said heads for causing the hairs to be cut to extend substantially normal to the skin surface, the skin-contacting face of one of the cutter heads being of obtuse inverted V-shape in a direction at right angles to the longitudinal direction of extent of the head so as to present an edge to the skin, said head having slots formed therein extending transversely of said head and extending through the said edge, whereby the tension in the skin caused by the longitudinal curvature of the other cutter head causes the skin to bulge into the slots at the edge of the said one head to a greater extent than would occur if the said one head were not formed with said edge.

VICTOR KOBLER.
WERNER KOBLER.

REFERENCES CITED

The following references are of record in the file of this patent:

UNITED STATES PATENTS

| Number | Name | Date |
|---|---|---|
| 2,164,425 | Rand, Jr. | July 4, 1939 |
| 2,315,274 | Rand, Jr. | Mar. 30, 1943 |
| 2,335,413 | Hicks | Nov. 30, 1943 |
| 2,379,969 | Kobler | July 10, 1945 |

FOREIGN PATENTS

| Number | Country | Date |
|---|---|---|
| 586,875 | Great Britain | Apr. 3, 1947 |